April 6, 1943. T. V. BUCKWALTER 2,316,046
TRUCK
Filed July 26, 1941 2 Sheets-Sheet 1
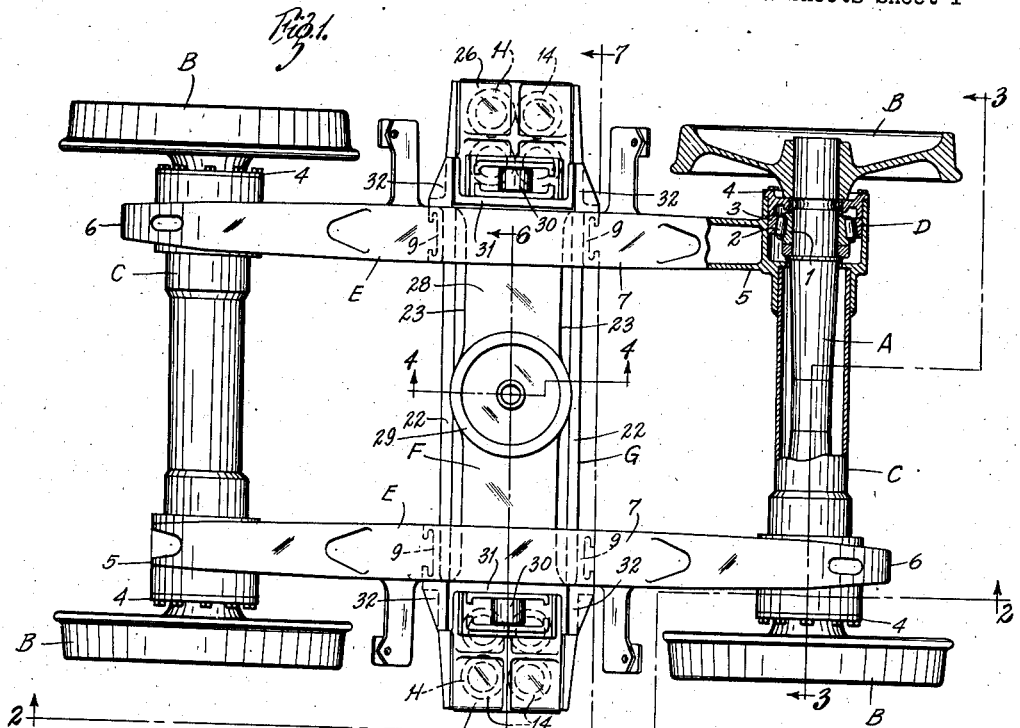
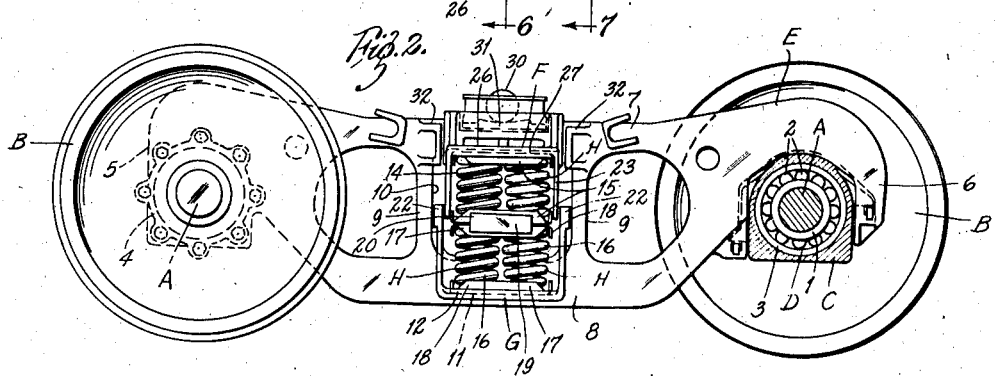
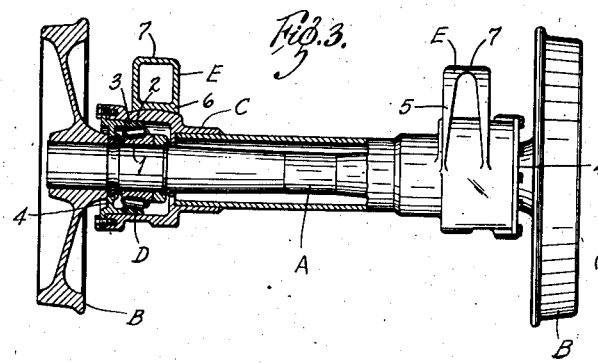
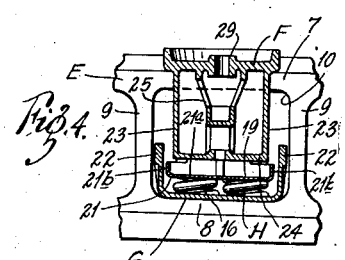
INVENTOR:
Tracy V. Buckwalter,
by Cantlan & Gravely
HIS ATTORNEYS April 6, 1943. T. V. BUCKWALTER 2,316,046
TRUCK
Filed July 26, 1941 2 Sheets-Sheet 2
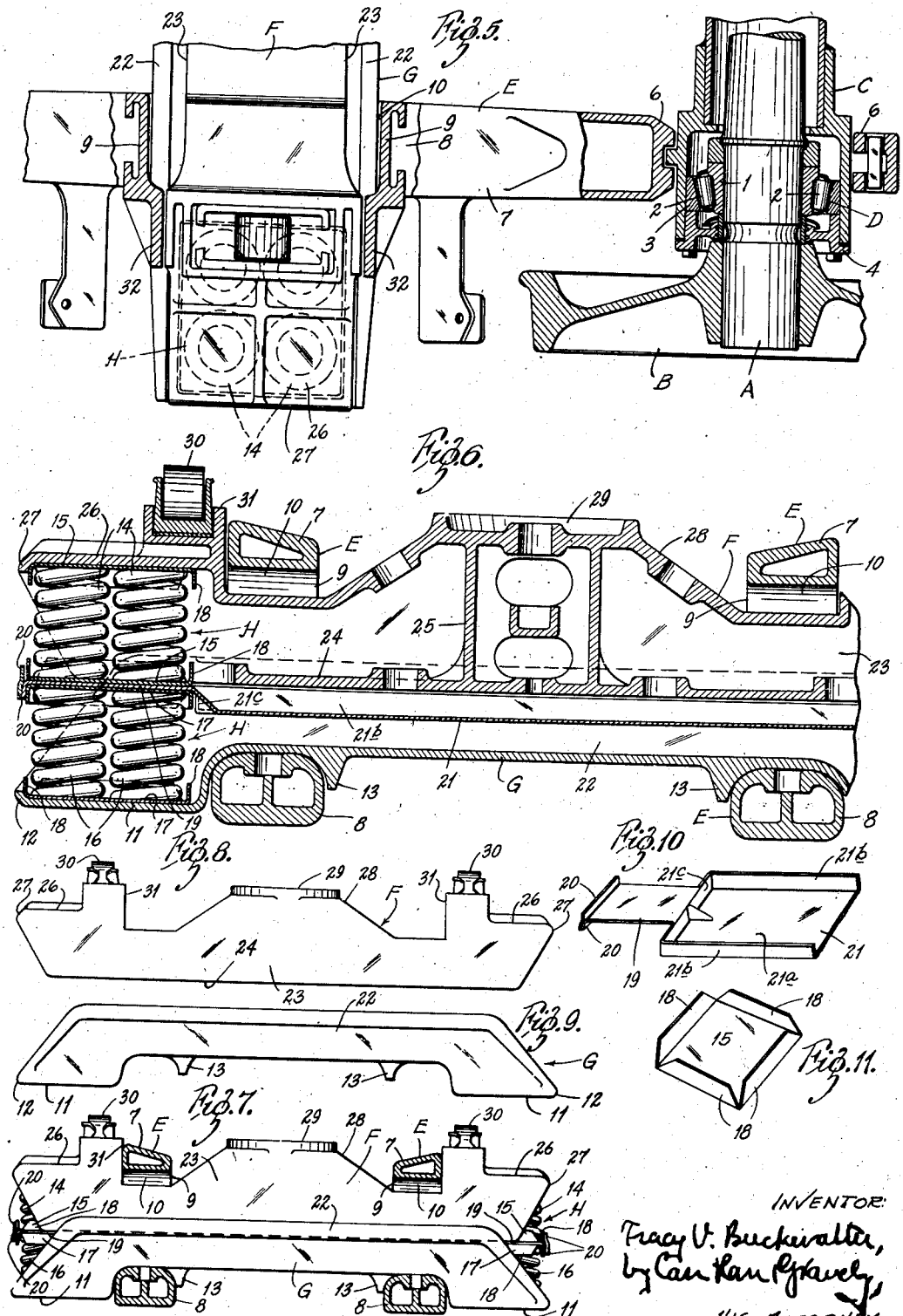
INVENTOR:
Tracy V. Buckwalter,
by Carl Van Gravely
HIS ATTORNEYS Patented Apr. 6, 1943

2,316,046

UNITED STATES PATENT OFFICE 2,316,046

TRUCK

Tracy V. Buckwalter, Massillon, Ohio, assignor to The Timken Roller Bearing Company, Canton, Ohio, a corporation of Ohio Application July 26, 1941, Serial No. 404,139

3 Claims. (Cl. 105—182)

My invention relates to railway car trucks and has for its principal object to provide a car truck which has improved riding qualities especially when used on cars in high speed passenger and freight service.

The invention consists in the railway car truck and in the parts and combinations and arrangements of parts hereinafter described and claimed.

In the accompanying drawings which form part of this specification and wherein like reference characters refer to like parts wherever they occur, Fig. 1 is part plan view, part horizontal sectional view of a railway car truck embodying my invention, Fig. 2 is a sectional view taken on the line 2—2 in Fig. 1, Fig. 3 is a sectional view taken on the line 3—3 in Fig. 1, Fig. 4 is a sectional view taken on the line 4—4 in Fig. 1, Fig. 5 is an enlarged part plan, part horizontal sectional view of a portion of the car truck, Fig. 6 is a sectional view taken on the line 6—6 in Fig. 1, Fig. 7 is a sectional view taken on the line 7—7 in Fig. 1, Fig. 8 is a side elevational view of the bolster, Fig. 9 is a side elevational view of the main spring plank, Fig. 10 is a perspective view of a portion of the auxiliary spring plank; and Fig. 11 is a perspective view of one of the spring cap members.

My car truck, which is of the inboard type, comprises generally, a pair of axles A having flanged wheels B fixed thereon, axle housings C enclosing the axles between the wheels, tapered roller bearings D interposed between the ends of the axle housing and the axle, truck side frames E connecting said axle housings C, a bolster F and a spring plank G, said bolster and said spring plank extending transversely across the middle of said truck. Each of the tapered roller bearings D interposed between the axle housing and the axle comprises an inner raceway member or cone 1, a series of tapered rollers 2, and an outer raceway member or cup 3. The ends of the axle housings having suitable closures 4 secured thereto.

One end 5 of each side frame is preferably integral with the end of one axle housing forming a rigid corner and the other end of each side frame has a jaw 6 fitting over the end of the other axle housing, the rigid corners of said truck being diagonally opposite each other. Such a truck is shown in my Patent No. 1,640,180 dated August 23, 1927.

Each side frame E has an upper member 7 and a lower member 8 extending longitudinally thereof and vertical members or columns 9 connecting said upper and lower longitudinal members to form an opening 10. The spring plank G and bolster F are disposed transversely across the truck and their ends extend through the bolster openings 10 and outwardly of the side frames. Springs, generally indicated as H, are mounted on each end of said spring plank, said springs being interposed between said spring plank and the ends of said bolster to provide a support for said bolster. The spring plank G is channel-shaped and the ends are offset downwardly from the portions thereof extending through the opening 10 in the spring plank to form seats 11 for said springs H and the outer ends of said seats have short upstanding flanges 12 to retain said springs in said seats. Lugs 13 depending from the bottom of said spring plank are provided inwardly of the side frames and cooperate with the offset end portions to retain said plank in proper position.

The springs H interposed between each end of said bolster and said spring plank comprise a group of four upper springs 14 having wear plates 15 at the top and bottom thereof and a group of four lower springs 16 having wear plates 17 at the top and bottom thereof, said wear plates having flanges 18 at the sides thereof. Each spring of said upper group is in vertical alinement with the corresponding spring of said lower group.

Interposed between the upper wear plates 17 of the lower groups of springs 16 and the lower wear plates 15 of the upper groups of springs 14 are the ends of an auxiliary spring plank 19, the ends of said auxiliary spring plank being folded upon themselves to form upwardly and downwardly extending flanges 20 which retain said auxiliary spring plank in position between said wear plates. The central portion 21 of said auxiliary spring plank 19 between the springs on each side of said truck is of rectangular pan shape, having a bottom wall 21a, side walls 21b, and end walls 21c. The sides 22 of said main spring plank telescope over the sides 23 of the bolster F, thus enclosing the central portion of the auxiliary spring plank.

The bolster F is hollow and the bottom wall 24 terminates short of the ends thereof, said bolster having a reinforcing member 25 in the middle portion thereof. The ends of said bolster are offset upwardly from the portions extending through the openings 10 in the side frames and they form spring seats 26 whose end portions have short flanges 27 depending downwardly therefrom. The top 28 of the bolster is provided with the center bearing 29 and side bearings 30 and with upstanding flanges 31 outwardly of the side frames which slidably engage the top members of said side frames above the bolster springs for guidance laterally of said truck.

Each side frame is provided with outwardly extending brackets 32 which slidably engage the sides of the bolster and prevent displacement of the bolster longitudinally with reference to the truck.

My truck offers numerous advantages. By disposing the springs outwardly of the side frames, the distance between the spring centers is increased, thereby improving the spring action. By offsetting the ends of the spring plank downwardly and the ends of the bolster upwardly, sufficient space is provided between the bolster and the spring plank so that a double spring set may be used, the springs of which act in series, thus giving double the deflection for the same spring load. This also provides for soft spring action and improved riding qualities. The use of an auxiliary spring plank further improves the riding qualities of the truck.

Obviously, numerous modifications of my invention may be made and I do not wish to be limited to the precise construction shown.

What I claim is:

1. An inboard car truck comprising axles, wheels on the ends thereof, housings for said axles, side frame members connecting said housings inwardly of said wheels, said side frames having central openings with bottom walls, a spring plank extending through said openings seating on said bottom walls and having stepped down end portions projecting outwardly beyond said side frames, springs on said projecting end portions of said spring plank, a secondary spring plank whose ends rest on said springs, springs on the end portions of said secondary spring plank in vertical alinement with the springs on said spring plank, and a bolster extending through said side frame openings and having upwardly offset projecting portions resting on said last named springs.

2. An inboard car truck comprising axles, wheels on the ends thereof, housings for said axles, side frame members connecting said housings inwardly of said wheels, said housings being fixed to said side frames at two diagonally opposite corners and movable therein at the other two corners, said side frames having central openings with bottom walls, a spring plank extending through said openings seating on said bottom walls and having stepped down end portions projecting outwardly beyond said side frames, springs on said projecting end portions of said spring plank, a secondary spring plank whose ends rest on said springs, springs on the end portions of said secondary spring plank in alinement with the springs on said spring plank, and a bolster extending through said side frame openings and resting on said last named springs.

3. An inboard car truck comprising axles, wheels on the ends thereof, housings for said axles, side frame members connecting said housings inwardly of said wheels, said side frame members being fixed to said housings at two diagonally opposite corners and movable thereon at the other two corners, said side frames having central openings with bottom walls, a spring plank extending through said openings, seating on said bottom walls and having stepped down end portions projecting outwardly beyond said side frames, springs on said projecting end portions of said spring plank, a secondary spring plank whose ends rest on said springs, springs on the end portions of said secondary spring plank, a bolster extending through said side frame openings and resting on said last named springs, brackets extending from the outer sides of said side frames adjacent to said bolster to prevent said bolster from moving longitudinally of said truck, and flanges projecting upwardly from the top of said bolster to engage said side frames to prevent said bolster from moving laterally of said truck.

TRACY V. BUCKWALTER.